_United States Patent Office_ 2,801,268
Patented July 30, 1957

2,801,268

METHOD OF MAKING 2-TERTIARYBUTYL-4-ALKOXY PHENOL

Marshall R. Brimer, Kingsport, Tenn., assignor to Eastman Kodak Company, Rochester, N. Y., a corporation of New Jersey No Drawing. Application November 24, 1953,
Serial No. 394,210

6 Claims. (Cl. 260—613)

This invention relates to a process for preparing 2-tertiarybutyl - 4 - alkoxy phenol and is particularly concerned with the preparation of 2-tertiarybutyl - 4 - methoxy phenol containing minimum amounts of the corresponding 3-tertiarybutyl isomer of lower antioxidant activity.

Monobutylated hydroxy anisoles have found widespread utility as antioxidants in fats, oils and other materials normally subject to oxidation. The usual commercial preparations of this material consist of a mixture of the highly active 2-tertiarybutyl - 4 - methoxy phenol together with the less active 3-tertiarybutyl-4-methoxy phenol and minor amounts of the corresponding dimethyl ether. One process which has been used for many years in preparing such mixed isomers involves the reaction of hydroquinone with a methylating agent to form 4-methoxy-phenol, followed by alkylation of the latter with a material capable of furnishing a tertiarybutyl radical, such as isobutylene or tertiarybutyl alcohol.

This process, however, is costly to operate because it is not possible to completely convert the hydroquinone to the corresponding 4-methoxy phenol by presently known processes. At least a portion of the hydroquinone is converted to 1,4-dimethoxy-benzene which cannot be used in the preparation of the desired tertiarybutyl - 4 - methoxy phenol. Furthermore, the butylation of 4-methoxy phenol usually results in the formation of substantial amounts of the dibutylated derivatives in admixture with the desired product and the unreacted starting materials. This necessitates a separation of the reaction mixture; and, although the unreacted 4-methoxy phenol can be recovered and recycled, the dialkylated derivative is of little value in the process.

Furthermore the product consists predominantly of the less potent 3-tertiarybutyl-4-methoxy phenol, together with not over about 50% of the desired 2-tertiarybutyl isomer which has been found to possess a considerably higher degree of antioxidant activity in fats, vegetable oils, and the like.

As a consequence, the present commercial production of monotertiarybutyl - 4 - methoxy phenols is usually effected by first forming monotertiarybutyl hydroquinone and then etherifying this material with a suitable alkyl etherifying agent, such as dimethyl sulfate, methyl acid sulfate, methyl chloride, or methyl phosphate, to form a mixture comprising about twice as much 2-tertiarybutyl - 4 - methoxy phenol as the undesired 3 - tertiarybutyl isomer. The preparation of tertiarybutyl hydroquinone and its conversion to isomers of tertiarybutyl-4-methoxy phenol is described in detail in the copending application of Young and Rodgers, Serial No. 277,548, filed March 19, 1952, now Patent 2,722,556.

In this process, hydroquinone is reacted with either isobutylene or tertiarybutyl alcohol in an aromatic hydrocarbon solvent of from 6 to 8 carbon atoms and in the presence of phosphoric acid and at an elevated temperature. By this method, the monoalkylated derivative is formed first and goes into solution in the aromatic hydrocarbon phase where it is protected from further alkylation. Typical solvents which are employed as the nonmiscible phase are toluene and xylene.

The monotertiarybutyl hydroquinone is then converted to the mixed isomers of tertiarybutyl - 4 - methoxy phenol by etherifying the monotertiarybutyl hydroquinone at elevated temperatures with an alkyl etherifying agent, such as dimethyl sulfate, in the presence of aqueous sodium hydroxide. Under these conditions, the amount of dimethyl ether is minimized and the desired 2-tertiarybutyl isomer predominates over the less desirable 3-tertiarybutyl isomer by a ratio of 2 to 1.

The conversion efficiency of the latter portion of this process is further enhanced by the use of an immiscible hydrocarbon solvent to form a nonaqueous phase whereby monotertiarybutyl-4-methoxy derivatives leave the aqueous alkali during the course of this reaction as fast as they are formed. By this method which is described in the copending application of Clemens, Serial No. 350,763, filed April 23, 1953, now Patent 2,776,321, the conversion of the monotertiarybutyl hydroquinone to the monoether mixture is raised to a yield of more than 90%. The ratio of isomers, however, does not change and nearly one-third of the product is the relatively low potency 3-tertiarybutyl isomer.

It is accordingly an object of this invention to provide a method of making 2 - tertiarybutyl - 4 - alkoxy phenols while minimizing the formation of the corresponding 3-tertiarybutyl isomer.

It is another object of this invention to provide an improved method of converting substantially all of the monotertiarybutyl hydroquinone to a highly potent antioxidant particularly suitable for use in fats, oils, and similar materials subject to oxidation.

It is a further object of this invention to reduce the objectionable formation of 3 - tertiarybutyl - 4 - alkoxy phenols and the corresponding dimethyl ethers during the preparation of 2-tertiarybutyl-4-alkoxy phenol.

Another object of the invention is to provide a cyclic process wherein the amount of 2-tertiarybutyl-4-methoxyphenol withdrawn as product is substantially equivalent to the amount of monotertiarybutyl hydroquinone being added to the process.

Another object of the invention is to increase the commercial yield of 2-tertiarybutyl-4-methoxy phenol and thereby make available larger quantities of this highly potent material at less cost.

Another object of the invention is to etherify monotertiarybutyl hydroquinone under conditions not employed heretofore and thereby directing the course of the reaction towards formation of the desired isomer.

Other objects will be apparent from the description and claims which follow.

These and other objects are attained by means of this invention as described more fully hereinafter with particular reference to certain preferred embodiments thereof and to particular reaction conditions under which the reaction is highly effective. I have now found that by incompletely etherifying monotertiarybutyl hydroquinone with an alkyl etherifying agent containing from 1 to 4 carbon atoms in each alkyl group under alkaline conditions at a temperature below about 30° C. and in an inert medium in which both the reactants and the reaction products are at least partially soluble at the reaction temperature, the product obtained consists predominantly, if not essentially, of the desired isomer. The unreacted monotertiarybutyl hydroquinone can be readily recovered and recycled in the process whereby the monotertiarybutyl hydroquinone is effectively converted almost quantitatively to the desired product. While the reactants and the reaction products need not, under reaction conditions, be completely soluble in the inert medium, at least a portion of the reactants must be in solution to such a degree as to permit reaction. The remainder of the reactants can be in suspension. In other words, the process is operative if the medium containing the reactants is stirrable.

The incomplete etherification of monotertiarybutyl hydroquinone in accordance with this invention is effected by employing the alkyl etherifying agent in an amount which is not sufficient to etherify all of the monotertiarybutyl hydroquinone. The reaction is effected at a temperature below 30° C. and desirably at temperatures as low as 0° C. or lower such as −5° C. or the like although temperatures of 10° C. or 20° C. can be employed. This is in contrast to the prior processes wherein the reaction was effected at elevated temperatures, such as at reflux temperature of the aqueous solution, in an attempt to increase the conversion of the monotertiarybutyl hydroquinone. Although low temperatures are employed in practicing this invention, the reaction time is actually considerably less than that which was used in such prior processes. Thus, for example, in the process embodying this invention the necessary reaction can ordinarily be effected in a period of only about 1 hour although longer times can be used. This is in contrast to a reaction period of from 12 to 16 hours for processes carried out at reflux temperatures. Optimum results are obtained by effecting the reaction under conditions such that only 60 to 70% of the monotertiarybutyl hydroquinone is converted to the corresponding monoether. Higher or lower conversion efficiencies can be used, however, and are within the scope of this invention.

In effecting the etherification embodying this invention, any of the well-known alkyl etherifying agents having from 1 to 4 carbon atoms in each alkyl group can be employed. Thus, for example, the etherifying agent can be a dialkyl sulfate such as dimethyl sulfate, diethyl sulfate, dipropyl sulfate, or dibutyl sulfate; an alkyl acid sulfate such as methyl acid sulfate, ethyl acid sulfate, propyl acid sulfate, or butyl acid sulfate; an alkyl chloride such as methyl chloride, ethyl chloride, propyl chloride, or butyl chloride; or an alkyl phosphate such as methyl phosphate, ethyl phosphate, propyl phosphate, or butyl phosphate; or similar alkyl etherifying agent. Optimum results are obtained using dimethyl sulfate or a similar dialkyl sulfate and such materials are, therefore, preferably employed.

The reaction embodying this invention proceeds most satisfactorily when effected under alkaline conditions. Thus, the reaction mixture ordinarily includes an alkaline hydroxide such as an alkali metal hydroxide or an alkaline earth hydroxide. From the economic standpoint, sodium hydroxide is desirably employed although potassium hydroxide can be used with equally good results and such other hydroxides as barium hydroxide are suitable. The incomplete etherification is achieved most readily by employing the alkyl etherifying agent in less than the stoichiometric amount necessary for complete etherification. The alkaline hydroxide is desirably employed in a ratio of 1 mole equivalent of such hydroxide to 1 mole equivalent of the etherifying agent.

When practicing the invention, the reaction is carried out in an inert solvent in which both the reactants and the reaction products are at least partially soluble at the reaction temperature. Any of the well-known solvents having this characteristic can be employed as typified by dioxane. Particularly good results are obtained, however, by using a methanolic solvent which can be either pure methanol or aqueous methanol. At temperatures in the vicinity of 30° C., pure methanol can be used interchangeably with aqueous methanol. At temperatures of the order of 0° C., however, aqueous methanol is preferably employed for best results although pure methanol can be used. In a preferred embodiment of the invention, mixtures from 40 to 60% methanol in water are employed since concentrations in this range give maximum solubility of the reactants and reaction products. Although the ratio of solvent to reactant material is not particularly critical, it is preferred to use at least twice as much solvent by weight as the weight of the monotertiarybutyl hydroquinone. Since the reaction mixture is ordinarily stirred during reaction, the use of lesser amounts of solvent causes difficulty in maintaining effective agitation. Larger amounts of solvent can be employed without adversely affecting the course of the reaction, but amounts of greater than 2 to 1 are not usually employed because the equipment is filled unnecessarily with large volumes of solvent and the amount of product in each batch is thus decreased.

As was indicated, the reaction time is not critical. It is preferred to effect the reaction in from 30 minutes to two hours. Longer times can be employed but are unnecessary, and shorter times merely result in a lower conversion efficiency for each reaction cycle. Because of the tendency of the product to form colored oxidation products in solution, the process is preferably effected under slightly reducing conditions in accordance with the usual practice or under a blanket of an inert gas such as nitrogen or the like, or both. The usual practice for maintaining slightly reducing conditions during the reaction involves incorporating a small amount of a protective material in the reaction mixture. This protective material can be a finely divided metal having reducing properties such as zinc or other equivalent metal or it can be a material such as sodium hydrosulfite or the like. Zinc dust is preferably employed and it has been found that amounts of from 0.1% up to about 1% are entirely suitable for substantially eliminating the formation of undesirable colored by-products. When the product contains a trace of residual color, it can be purified by distillation in the presence of about 0.1% zinc dust.

When the incomplete etherification embodying this invention has been effected to the desired degree, the reaction product is separated from the reaction solution. Usually any of the undesired 3-tertiarybutyl isomer and dimethyl ether which is formed separates out with the desired isomer. By means of this invention, however, the amounts of such undesired materials are greatly minimized and mixed isomers are readily obtained which contain in excess of 90–95% of the desired isomer together with less than 5–10% of the undesired isomer. Usually the formation of the dimethyl ether is also kept at less than 5%. The reaction product is readily separated out from the reaction mixture by diluting the reaction mixture with water, making it strongly alkaline and removing the methyl alcohol by distillation. When such a reaction solution is depleted in methanol and diluted with an equivalent amount of water and then cooled to about 10 to 15° C., the reaction product crystallizes out in almost quantitative amounts and can be readily removed by filtration. This solid product can be purified by distillation under vacuum to give a highly purified product free of objectionable amounts of unwanted isomers and by-products. A further advantage is that the crude reaction product, after crystallization, is quite stable and can be stored in open drums until needed. This eliminates the necessity of having extra storage tanks and of protecting the color of the distilled material for long periods of time. Furthermore, since the unreacted monotertiarybutyl hydroquinone remains in the reaction solution after crystallization of the product, the product has a much greater color stability than is the case with materials containing monotertiarybutyl hydroquinone. Because of the very low concentration of the undesired 3-tertiarybutyl isomer, the product need not be reworked except for distillation and hence is available at once for use.

After the product has been recovered from the reaction solution, the unreacted monotertiarybutyl hydroquinone is also recovered. This is readily done by acidifying the reaction solution concentrated to a smaller volume and cooling it to precipitate the unreacted monotertiarybutyl hydroquinone. This unreacted material can then be recycled through the process as described hereinabove. In a cyclic process, the unreacted material which has been recovered is replenished with additional amounts of the etherifying agent and fresh monotertiarybutyl hydroquinone which is added in amounts correlated to the amount of product withdrawn. When the process is run by repeated cycles of this kind, the amount of monotertiarybutyl hydroquinone being added to replenish the reaction mixture is equivalent to the amount withdrawn as product and hence the conversion efficiency of the process is substantially 100%.

The exact reason why the process embodying this invention proceeds in this fashion is not clearly understood and the invention will not be limited by any theory as to the reason for the advantageous results obtained. It is believed, however, that the reaction is probably influenced to proceed in the desired manner because the alkaline material does not activate or form a sodium salt with the hindered phenol group at the low temperatures employed. A second feature which may influence the reaction is that the use of substantially equivalent amounts of dimethyl sulfate and alkali causes only one methyl group of the dimethyl sulfate to be utilized for the etherification.

The product which is obtained in accordance with this invention usually contains little or no unreacted monotertiarybutyl hydroquinone and from 95 to 97% of monotertiarybutyl-4-methoxy phenol. This latter material usually consists of from 93 to 97% of the desired 2-tertiarybutyl-4-methoxy phenol and not more than 3 to 7% of the 3-tertiarybutyl-4-methoxy phenol.

The invention is illustrated by the following examples of certain preferred embodiments thereof. It will be understood, however, that the examples are included merely for purposes of illustrating the best mode of practicing the invention and are not intended to limit the scope of the invention unless otherwise specifically indicated.

*Example 1*

Into a 1-liter, three-necked, round-bottom flask were charged 100 g. (0.603 moles) of monotertiarybutyl hydroquinone, 121 g. of water, 96 g. of methanol, and 19 g. (0.475 moles) of sodium hydroxide. The resulting mixture was stirred until solution was complete. The temperature of the solution was then lowered to 0° C. and a 57.5 g. batch of dimethyl sulfate was added over a 30-minute period while keeping the temperature at 0° C. Following the addition of the dimethyl sulfate, the reaction mixture was stirred for an additional 30 minutes. Thereafter, 24 g. of sodium carbonate in 240 cc. of water was added and the methyl alcohol was removed by distillation. The solution was then made strongly alkaline by adding 19 g. of sodium hydroxide in 180 cc. water plus an additional amount of water equal to the water removed during the distillation of the methanol. The mixture was cooled to 10° C. and filtered and the crude 2-tertiarybutyl-4-methoxy phenol remaining on the filter was washed with 200 cc. of water. This crude product was transferred to a vacuum still and distilled at a pressure of 10 mm. of mercury. The filtrate was combined with the wash water and acidified with approximately 30 g. of sulfuric acid. This acidified mixture was concentrated to a total weight of 550–600 g. and cooled to 30° C. and filtered. The recovered monotertiarybutyl hydroquinone obtained on the filter was washed with water and dried to constant weight. The unreacted monotertiarybutyl hydroquinone recovered from this first cycle amounted to 38 g. This material was then replenished with sufficient fresh monotertiarybutyl hydroquinone to make 100 g. and the process was repeated as described with fresh amounts of methanol, dimethyl sulfate and caustic. At the end of the second cycle, 39.5 g. of unreacted monotertiarybutyl hydroquinone was recovered, replenished, and recycled again. At the end of the third cycle, 33.8 g. of monotertiarybutyl hydroquinone was recovered and recycled for the fourth cycle. At the end of the fourth cycle, 33.3 g. of unreacted monotertiarybutyl hydroquinone was recovered and charged into the fifth cycle. It is thus apparent that the amount of unreacted monotertiarybutyl hydroquinone quickly reached a relatively steady value and hence substantially all of the monotertiarybutyl hydroquinone being added to replenish the reaction mixture was being converted to product.

At the end of the five cycles, after deducting the amount of monotertiarybutyl hydroquinone recovered at the end of the fifth cycle, it was found that a net weight of 322.1 g. of monotertiarybutyl hydroquinone had been charged to the process. The distilled product which was obtained weighed 318.1 g. and consisted of 96.8% monotertiarybutyl-4-methoxy phenol and 3.2% monotertiarybutyl hydroquinone dimethyl ether. Thus, of the monotertiarybutyl hydroquinone charged to the 5 runs, only 2.54% was converted to the dimethyl ether and 88.5% was converted to the monotertiary-4-methoxy phenol while the remainder was lost in distillation residue, mother liquor, or otherwise unaccounted for. The monoether fraction consisted of 96.2% of the desired 2-tertiarybutyl-4-methoxy phenol and only 3.8% of the 3-tertiarybutyl-4-methoxy phenol.

*Example 2*

A solution was prepared of 83 g. (0.5 moles) of monotertiarybutyl hydroquinone, 160 g. of methanol, and 18.5 g. (0.462 moles) of sodium hydroxide. The solution was cooled to 27–30° C. and maintained at this temperature while a 60 g. portion of dimethyl sulfate was added over a 30-minute period. Following the addition of the dimethyl sulfate, the reaction mixture was maintained at 27–30° C. for an additional 30 minutes. Thereafter, 30 g. of sodium carbonate and 200 g. of water were added and the methanol was removed by distillation. A solution of 9 g. of sodium hydroxide in 440 g. of water was then added and the mixture was cooled to 10° C. and filtered. The crude monotertiarybutyl-4-methoxy phenol was washed with water and vacuum dried and distilled. The product thereby obtained weighed 63 g. and contained 1.1% of unreacted monotertiarybutyl hydroquinone, 9% monotertiarybutyl hydroquinone dimethyl ether, and 89.9% of monotertiarybutyl-4-methoxy phenol isomers. The isomer fraction consisted of 92% of the desired 2-tertiarybutyl isomer and 8% of the 3-tertiarybutyl isomer. The mother liquid was acidified with approximately 30 g. of sulfuric acid and extracted with toluene. The toluene extract was evaporated leaving 15.8 g. of recovered monotertiarybutyl hydroquinone.

*Example 3*

One hundred grams of monotertiarybutyl hydroquinone, 150 g. of water, 80 g. of methanol, and 19 g. of sodium hydroxide were charged into a one-liter, three-necked, round-bottom flask and stirred until completely in solution. The temperature was then lowered to 0° C. and 57.5 g. of dimethyl sulfate dropped in over a 30-minute period. The temperature was maintained at 0° C. for an additional 30 minutes following completion of such addition. The reaction mixture was neutralized with approximately 50 g. of 10% sulfuric acid. Thereafter, 24 g. of sodium carbonate in 240 g. of water was added and the mixture heated at reflux temperature for 1½ hours. The mixture was then cooled to 60° C. and 200 g. of 9.5% aqueous sodium hydroxide was added and the mixture cooled to 10° C. and filtered. The crude monoether product was washed on the filter with 200 g. of cold water and then transferred to a vacuum flask and distilled. The distilled product obtained thereby weighed 57.7 g. and consisted of 2.6% unreacted monotertiarybutyl hydroquinone, 0.8% monotertiarybutyl hydroquinone dimethyl ether, and 96.6% of monotertiarybutyl-4-methoxy phenols. This phenol fraction contained 95% of 2-tertiarybutyl-4-methoxy phenol and 5% of the 3-tertiarybutyl isomer. The mother liquor from the filtration was combined with the wash water, acidified with approximately 25 g. of concentrated sulfuric acid, cooled to 15° C. and filtered. In this way 37.5 g. of dry monotertiarybutyl hydroquinone was recovered. The filtrate was extracted with toluene and the extract evaporated to give 5.3 g. of monotertiarybutyl hydroquinone.

It can thus be seen that after the reaction has been effected at a temperature below 30° C. and neutralized, the reaction mixture can be heated to elevated temperatures without the formation of objectionable amounts of the undesired by-products.

Example 4

A solution of 83 g. of monotertiarybutyl hydroquinone and 29 g. of potassium hydroxide in 240 g. of methanol was cooled to 10° C. and 65 g. of dimethyl sulfate was dropped in over a period of one hour. The temperature was maintained at 8–10° C. for two hours after addition of the dimethyl sulfate. The solution was then diluted with 300 g. of water and the methanol was removed by distillation. The remaining mixture was extracted with toluene and the toluene washed 3 times with 200 g. portions of 2% sodium hydroxide solution. The toluene was evaporated and the crude product was distilled to give a distillate weighing 62.6 g. and consisting of 4% monotertiarybutyl hydroquinone dimethyl ether and 96% of monoethers. The monoether fraction consisted of 94.5% of 2-tertiarybutyl-4-methoxy phenol and 5.5% of 3-tertiarybutyl-4-methoxy phenol. The liquid remaining was acidified with approximately 30 g. of concentrated sulfuric acid. This mixture was then extracted with toluene to recover 16 g. of unreacted monotertiarybutyl hydroquinone.

Thus, by means of this invention products are prepared which contain in excess of 90% of 2-tertiarybutyl-4-alkoxy phenols together with unobjectionable amounts of the dimethyl ether and the 3-tertiarybutyl isomer. The monotertiarybutyl hydroquinone is either converted to the desired product or recovered in unreacted form and hence there is little loss of raw material. Although the yield of product is relatively low from a single batch, the process can be effected in cyclic fashion whereby the amount of product being recovered is substantially equivalent to the amount of monotertiarybutyl hydroquinone being added at each cycle. Thus, by means of this invention conversion efficiencies approaching 100% are attained. The desired product is readily separated from unreacted material and is in solid form which can be readily stored for prolonged periods without danger of undue color formation. Because of the very low percentage of the undesired isomer present in the crude product, it is not necessary to attempt to separate the isomeric mixture and to convert the unwanted isomer to the desired material. A simple distillation operation is usually all that is necessary in order to prepare highly concentrated products for direct use as food antioxidants.

Although the invention has been described in considerable detail with reference to certain preferred embodiments thereof, variations and modifications can be effected within the spirit and scope of the invention as described hereinabove and as defined in the appended claims.

I claim:

1. The method which comprises bringing together in a methanolic solvent monotertiarybutyl hydroquinone, dimethyl sulfate in not more than an equimolar amount based on said monotertiarybutyl hydroquinone and an alkaline hydroxide in an amount substantially equivalent to said dimethyl sulfate, maintaining the resulting solution at a temperature below 30° C. for a time sufficient to effect not substantially more than 70% etherification of said monotertiarybutyl hydroquinone, separating reaction product consisting essentially of 2-tertiarybutyl-4-methoxy phenol from the reaction solution, recovering unreacted monotertiarybutyl hydroquinone, and repeating the method employing said unreacted monotertiarybutyl hydroquinone.

2. The process which comprises the combination of steps, of bringing together a molar proportion of monotertiarybutyl hydroquinone, less than a molar proportion of dimethyl sulfate, an alkali metal hydroxide in an amount substantially equivalent to said dimethyl sulfate, and aqueous methanol in an amount of at least about twice the weight of said monotertiarybutyl hydroquinone, maintaining the resulting solution at a temperature below 30° C. for a time sufficient to etherify between about 60% and about 70% of said monotertiarybutyl hydroquinone, adding an amount of caustic sufficient to hold the monotertiarybutyl hydroquinone in solution, cooling said solution to a temperature effective to crystallize out 2-tertiarybutyl-4-methoxy phenol, separating said 2-tertiarybutyl-4-methoxy phenol from said solution, and recovering unreacted monotertiarybutyl hydroquinone, said unreacted monotertiarybutyl hydroquinone being re-employed in said first named step.

3. The method which comprises partially etherifying monotertiarybutyl hydroquinone by admixing a predetermined amount of monotertiarybutyl hydroquinone with less than a stoichiometric amount of dimethyl sulfate, sodium hydroxide in an amount substantially equivalent to said dimethyl sulfate, and a 40–60% aqueous methanol solution in an amount of at least twice the weight of said monotertiarybutyl hydroquinone, maintaining the resulting solution under mildly reducing conditions and a temperature of about 0° C. and not higher than 30° C. for a time sufficient for conversion of from 60% to 70% of said monotertiarybutyl hydroquinone to the corresponding monomethyl ether, separating out 2-tertiarybutyl-4-methoxy phenol from the reaction solution, and recovering unreacted monotertiarybutyl hydroquinone.

4. In the preparation of 2 - tertiarybutyl - 4 - alkoxy phenol by reacting monotertiarybutyl hydroquinone with an alkyl etherifying agent wherein each alkyl group contains 1–4 carbon atoms in the presence of an alkaline hydroxide, the improvement in minimizing the formation of 3-tertiarybutyl-4-alkoxy phenol which comprises reacting said monotertiarylbutyl hydroquinone with an amount of said alkyl etherifying agent less than the stoichiometric amount necessary for complete etherification in the presence of an amount of said alkaline hydroxide substantially equivalent to said alkyl etherifying agent, at a temperature below about 30° C. for a time sufficient to effect not substantially more than 70% etherification of said monotertiarybutyl hydroquinone, and in an inert solvent in which both the reactants and the reaction products are at least partially soluble at the reaction temperature.

5. In the preparation of 2-tertiarybutyl-4-alkoxy phenol by reacting monotertiarybutyl hydroquinone with an alkyl etherifying agent wherein each alkyl group contains 1–4 carbon atoms in the presence of an alkaline hydroxide, the improvement which comprises reacting said monotertiarybutyl hydroquinone with an amount of said alkyl etherifying agent less than the stoichiometric amount necessary for complete etherification in the presence of an amount of said alkaline hydroxide substantially equivalent to said alkyl etherifying agent at a temperature below about 30° C. for a time sufficient to effect not substantially more than 70% etherification of said monotertiarybutyl hydroquinone and in a methanolic solvent, separating unreacted monotertiarybutyl hydroquinone from the reaction product, replenishing said unreacted monotertiarybutyl hydroquinone with additional amounts of said monotertiarybutyl hydroquinone, said alkyl etherifying agent and said alkaline hydroxide correlated to the amounts used up in the first said reacting, again effecting said reacting and separating, and repeating said replenishing, reacting and separating until the amount of reaction product being withdrawn is substantially equivalent to the amount of monotertiarybutyl hydroquinone being added in said replenishing step.

6. In the preparation of 2-tertiarybutyl-4-alkoxy phenol by reacting monotertiarybutyl hydroquinone with a dialkyl sulfate having 1–4 carbon atoms in each alkyl group in the presence of an alkaline hydroxide, the improvement in minimizing the formation of 3-tertiarybutyl-4-alkoxy phenol which comprises reacting said monotertiarybutyl hydroquinone with less than the stoichiometric amount of said dialkyl sulfate necessary for complete etherification in the presence of an amount of said alkaline hydroxide substantially equivalent to said dialkyl sulfate at a temperature below about 30° C. for a time sufficient to effect not substantially more than 70% etherification of said monotertiarybutyl hydroquinone and in a methanolic solvent in which both the reactants and the reaction products are at least partially soluble at the reaction temperature.

References Cited in the file of this patent

UNITED STATES PATENTS

| | | |
|---|---|---|
| 1,281,662 | Zollinger et al. | Oct. 15, 1918 |
| 1,730,061 | Davidson | Oct. 1, 1929 |
| 2,470,902 | Rosenwald | May 24, 1949 |
| 2,632,025 | Grob | Mar. 17, 1953 |